United States Patent
Vacanti

(10) Patent No.: US 7,737,880 B2
(45) Date of Patent: Jun. 15, 2010

(54) MICROWAVE AND MILLIMETERWAVE RADAR SENSORS

(75) Inventor: David C. Vacanti, Renton, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/256,392

(22) Filed: Oct. 22, 2008

(65) Prior Publication Data

US 2010/0097263 A1    Apr. 22, 2010

(51) Int. Cl.
    G01S 13/93    (2006.01)

(52) U.S. Cl. .................... 342/70; 342/59; 342/100; 342/103; 342/159; 342/195

(58) Field of Classification Search .............. 342/70–72, 342/59, 175, 62, 100–103, 159, 195
    See application file for complete search history.

(56) References Cited

U.S. PATENT DOCUMENTS

| 5,940,457 A | 8/1999 | Dreifuss et al. |
| 6,570,458 B2 * | 5/2003 | Cuddy .................... 331/37 |
| 6,603,367 B2 * | 8/2003 | Pao et al. .............. 331/177 V |
| 7,324,039 B2 | 1/2008 | Boltovets et al. |
| 7,420,502 B2 * | 9/2008 | Hartzstein et al. ......... 342/70 |
| 2002/0196088 A1 * | 12/2002 | Cuddy .................... 331/38 |
| 2005/0285773 A1 * | 12/2005 | Hartzstein et al. ......... 342/70 |

* cited by examiner

Primary Examiner—John B Sotomayor

(57) ABSTRACT

A radar sensor system and method for vehicles. An example radar system includes a processor, a plurality of transceivers having antenna(e). The antenna of the transceivers are located at various points around the vehicle. The transceivers include receive and transmit electronics that are in signal communication with the corresponding antenna. The transmit electronics output radar signals via the antenna. The transmit electronics include a voltage controlled oscillator (VCO), a dielectric resonator oscillator (DRO), a phase locked loop (PLL) component and a direct digital synthesizer (DDS). The receive electronics receive from the antenna any radar reflections corresponding to the outputted radar signals and send signals associated with the radar reflections to the processor. The processor generates output signals based on the signals received from the plurality of transceivers.

13 Claims, 5 Drawing Sheets

MICROWAVE AND MILLIMETERWAVE RADAR SENSORS

BACKGROUND OF THE INVENTION

There are multiple automotive, marine and aviation applications where small, low cost millimeterwave (MMW) radar sensors are distributed around a vehicle to provide functions, such as adaptive cruise control, anti-collision warning, brake applications, parking, marine threat detection or marine docking guidance.

Many developers have created low cost MMW sensors, particularly for the automotive marketplace where production numbers can be in the 100,000s. Most use modulation that is either FM/CW or UltraWideband. In the typical application, each sensor provides its own modulation and signal processing in a single package. Adding more sensors requires adding complete radar and signal processing/control systems to each location and then combining data from each in yet another computing platform. This duplicates many functions.

The RF implementation of the MMW Radar subsystems has either been overly complex (frequency multiplication systems) or overly simple with poor RF performance (MMW Oscillator directly connected to an antenna and modulated). Both systems generate very high phase noise and varying modulation characteristics over time and environmental changes.

U.S. Pat. No. 7,324,039 to Boltovets et al. attempts to generate a MMW radar signal by frequency multiplication of an open loop X band Voltage Controlled Oscillator. This choice for FM/CW modulation also directly multiplies any modulation non-linearity and causes phase noise to increase by a factor of 20 Log N where N is the multiplication factor. Both factors significantly degrade the performance of the resulting system.

Overly simple systems that employ a directly modulated MMW VCO to avoid the use of frequency multiplication achieve an overly sensitive VCO that is easily made non-linear by circuit effects, temperature or movement of objects present in the antenna beam.

SUMMARY OF THE INVENTION

The present invention provides a low cost means to achieve the needed sensitivity of the microwave or MMW radar sensors with low phase noise and accurate modulation at the lowest possible cost of signal generation and signal processing. The proposed system has the advantage being scaled in size from one sensor to many sensors, all served by a common control and signal processing system.

An example radar system includes a processor and a plurality of transceivers having antenna(e). The transceivers and/or antennas of the transceivers are located at various points around the vehicle. The transceivers include receive and transmit electronics that are in signal communication with the corresponding antenna for outputting radar signals. The transmit electronics include a voltage controlled oscillator (VCO), a dielectric resonator oscillator (DRO), a phase locked loop (PLL) component and a direct digital synthesizer (DDS). The receive electronics receive from the antenna any radar reflections corresponding to the outputted radar signals and send signals associated with the radar reflections to the processor. The processor generates output signals based on the signals received from the plurality of transceivers.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
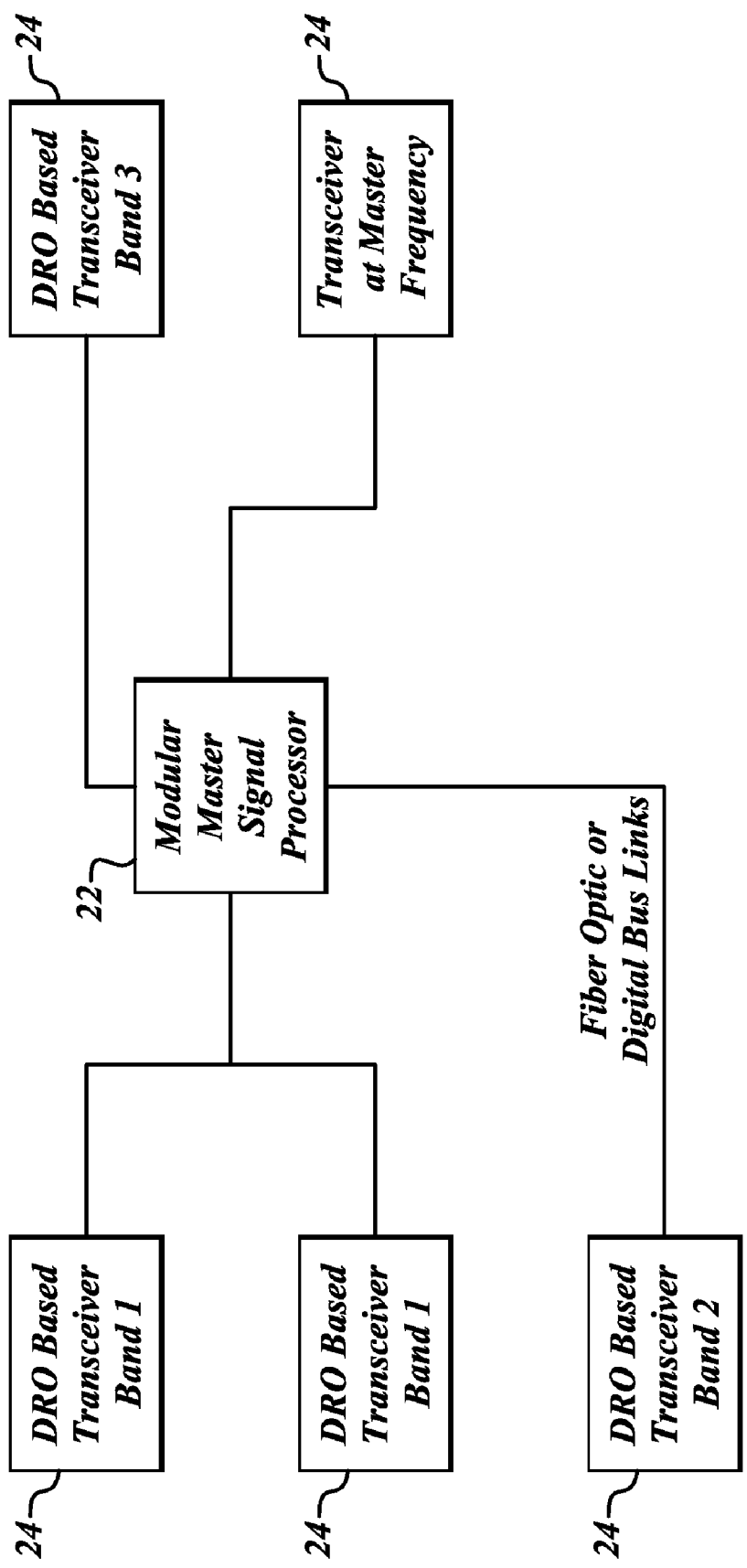
FIG. 1 is a block diagram of a system implemented on a vehicle or a building.

As shown in FIG. 1, the present invention provides a system 20 that includes a master signal processor 22 in signal communication with one or more radar components 24. The radar components 24 translate an operating frequency to Microwave or millimeterwave (MMW) range by mixing it with an "open loop" oscillator that operates at MMW frequencies that offers frequency stability over time, temperature and vibration, such as a Dielectric Resonator Oscillator (DRO) (example DROs are produced by Honeywell Inc.). The DRO provides excellent frequency stability over time, temperature and load conditions with very low phase noise. An array of radar components 24 are mounted to a vehicle or building and are controlled by the processor 22. The processor 22 determines if any of the radar components 24 have sensed any objects and outputs that determination to an operator.

The processor 22 provides control signals for altering the modulation or antenna scanning at each radar component 24. The processor 22 is programmable such that a sequence of modulation rates can be applied to the radar components 24 so that each is optimized for its application and location on a vehicle. The results measured by adjacent radar components 24 can be directly compared to generate additional intelligence about the dangers or situation around the vehicle.

The processor 22 permits the coordination of the multiple sensors (the radar components 24)—causing them to be synchronous and have specific offset frequencies in order to prevent jamming /interfering with each other. The processor 22 also has the ability to "sweep" from sensor to sensor to collect an overall image/data of the surroundings by interrogating them sequentially. This permits a single DSP/signal processing capability to be reused multiple times, thereby producing the unexpected results of reduced cost, power consumption, volume and weight. The processor 22 can also dwell at one sensor (the radar components 24) for as long as needed or jump between sensors as required as well with no particular pattern, according to the surveillance needs.

Figure 2:
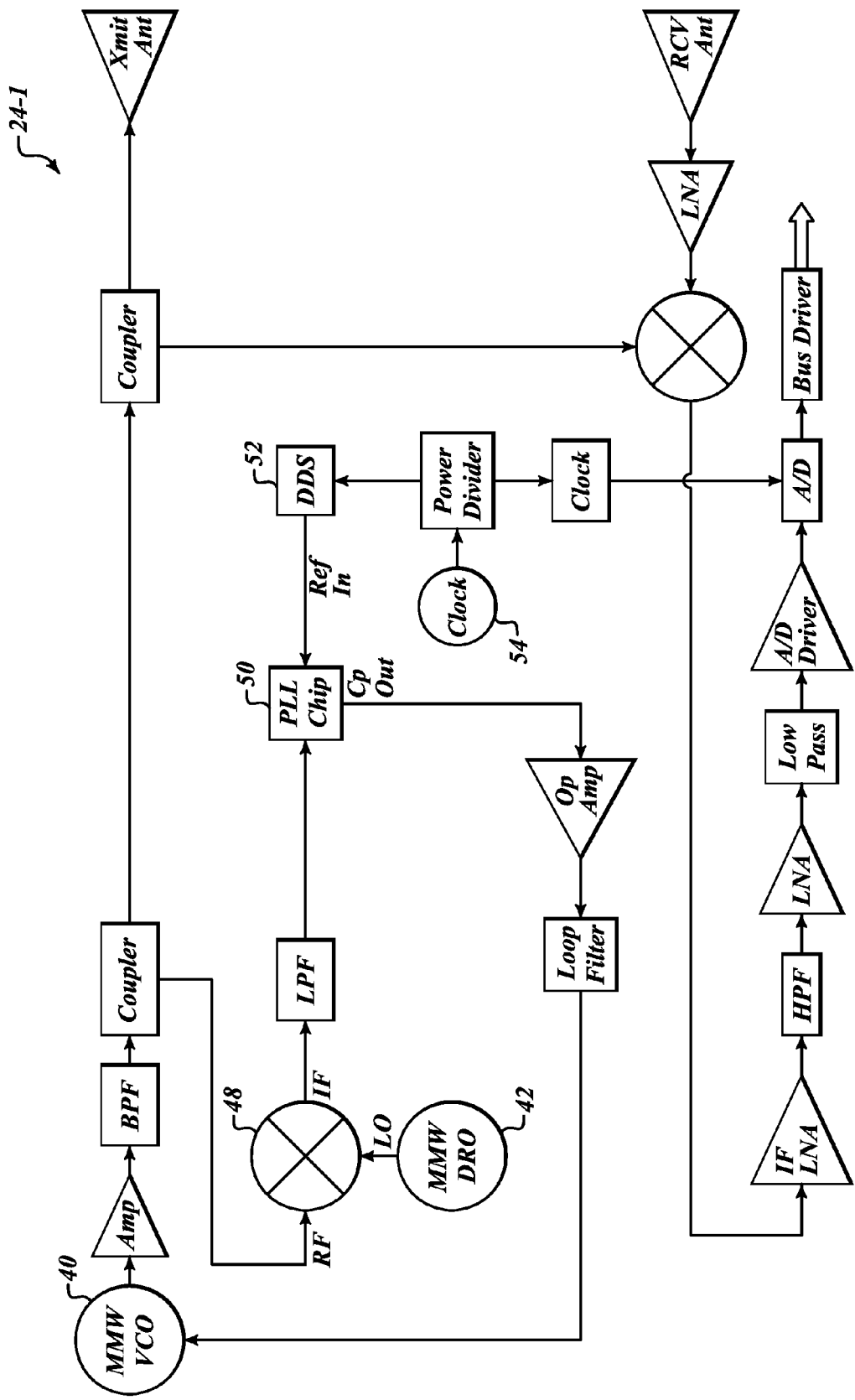
FIGS. 2 and 3 are system diagrams of example transceivers formed in accordance with embodiments of the present invention.

As shown in FIG. 2, an example radar component 24-1 includes a suitable microwave or MMW voltage controlled oscillator (VCO) 40 and a DRO 42 that is tuned to a frequency at a predefined level below the lowest expected VCO frequency. The output of the VCO and the DRO are mixed at a mixer 48 to generate an intermediate (IF) that may be divided down to produce an input signal to a phase locked loop (PLL) chip 50, such as that produced the ADF 4111 PLL manufactured by Analog Devices. The PLL chip 50 provides some frequency division and a Phase/Frequency detector and a charge pump are used to close the PLL chip 50. The PLL chip 50 includes the charge pump, phase/freq detector and frequency division component. The PLL chip 50 provides desired linearity and low phase noise present in both the DRO and VCO of approximately (−100 dBc/Hz at 100 KHz).

Figure 3:
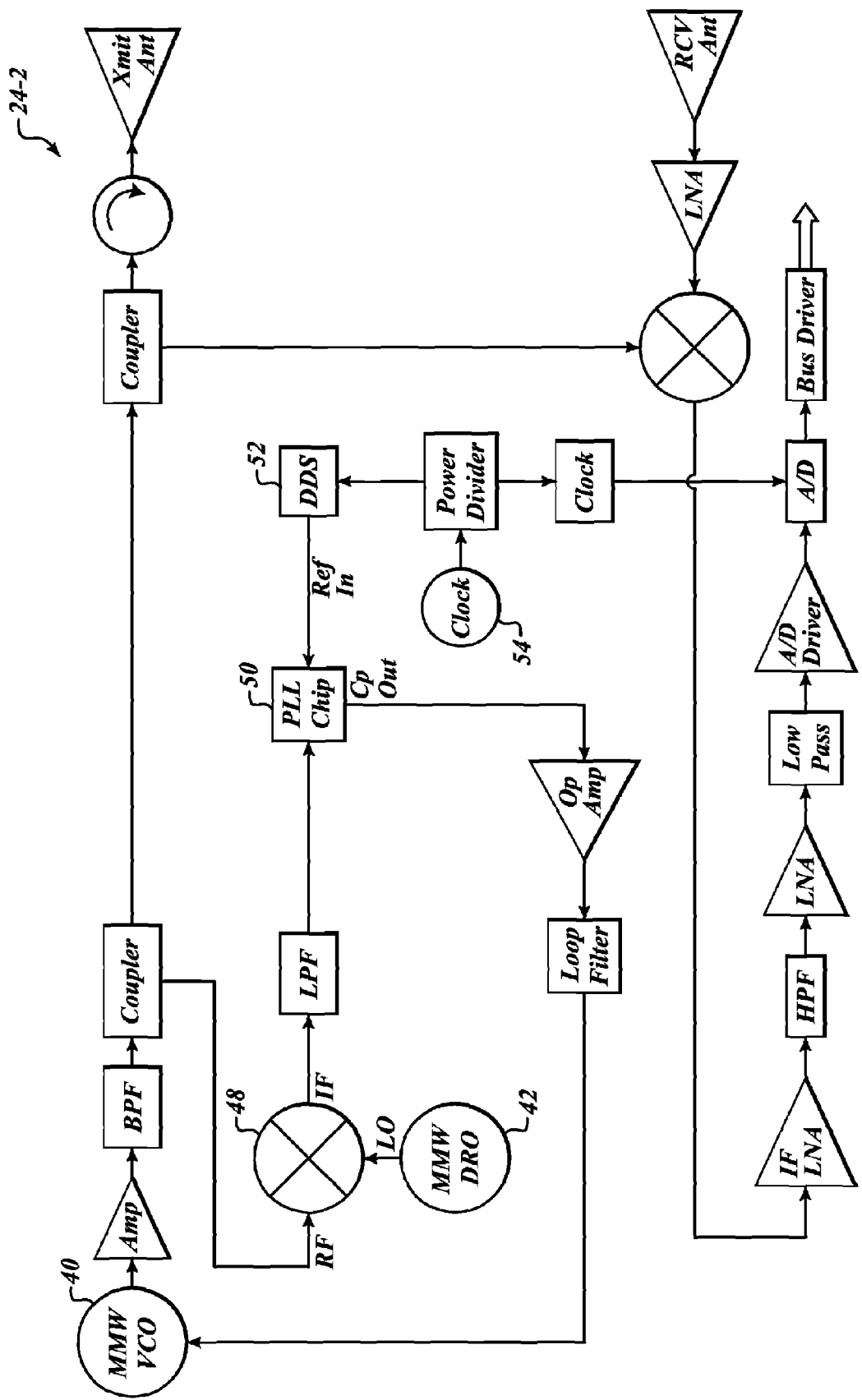

In one embodiment, as shown in FIG. 2, the radar component 24-1 is a dual antenna transceiver. As shown in FIG. 3, a radar component 24-2 is a single antenna transceiver. The receiver and transmitter components within the radar components 24-1 and 24-2 are the same except that the single antenna transceiver includes a circulator device attached to the antenna. A direct digital synthesizer (DDS) 52 provides a reference input signal to the PLL chip 50 based on signal from a clock 54. In one example, the clock 54 is a 125 MHz clock that causes the DDS 52 to produce the reference input signal at 25-31.25 MHz. The DDS frequencies are independent of the VCO and of the MMW operating frequency. The output of the PLL chip 50 is amplified and filtered then input to the VCO 40. The VCO 40 generates a signal that is amplified, filtered by a band pass filter, sent to the mixer 48 and then sent to a transmit antenna and receive antenna mixer via couplers.

The RF input to the mixer 48 is a sample of the entire transmitted bandwidth of the MMW sensor. So for example, if the sensor transmits between 24.00 GHz and 24.20 GHz (200 MHz BW) then the input to 48 RF port is 24.00 to 24.20 GHz. The exact bandwidth depends on the frequency division and the programmed frequency division within the PLL chip itself. So this system is programmable for many frequency ranges.

For a 24 GHz Radar that has FM/CW modulation between 24.00 and 24.20 GHz select a VCO that tunes from F (24.00 GHz) to F+0.2 GHz (24.2 GHz). Then one chooses a DRO at F-0.8 (23.2 GHz). When the DRO frequency is mixed with the VCO frequency range between 24 and 24.2 GHz the difference of the two frequencies is 0.8 to 1.0 GHz. Those difference frequencies of 0.8 to 1.0 GHz are the input to the PLL where it is divided by 32 within the PLL chip (e.g., ADF 4111) to produce 25-31.25 MHz that is in turn compared to the DDS input over the same frequency range. The use of the DRO to create a modest IF frequency range near 1 GHz is critical to permitting very low frequency divider ratios or the elimination of frequency multiplication modules. The DRO preserves very low phase noise that would otherwise be substantially higher with other methods.

If a wider bandwidth is desired, it is easy to increase the DDS bandwidth from 6.25 MHz to 12.5 MHz. The DDS chirp bandwidth is multiplied by the PLL via the divider ratio. So if the divide ratio is 32 and the DDS chirps over 12.5 MHz then 32×25=400 MHz of Chirp bandwidth with no change in phase noise performance from the 200 MHz chirp bandwidth. In this case the IF frequency range at the input to the PLL chip (ADF 4111) would increase from the original 0.8 to 1.0 GHz to 0.8 to 1.2 GHz. This IF frequency range will track the actual bandwidth of the modulated millimeter wave frequency source.

In one embodiment, carbon fiber composites enclose each of the radar components 24 to provide exceptionally strong and EMI/EMC absorption that prevents the radar components 24 from jamming or being jammed by other sensors on other vehicles etc. and at the same time provides physical protection from an outdoor environment.

A receive side of the radar components 24-1 and 24-2 includes common radar receiver components. The received signals are converted to digital then sent to the master processor 22 for analysis. Communication between the components 24-1 and 24-2 can be done over a data bus, fiber optic coils, wirelessly or by any other comparable means.

The sensors operate in the same band (i.e., 24 GHz, 77 GHz, 35 GHz, 95 GHz) but not at the same exact frequency ranges. Because the master controller 22 can command the sensors 24 it can do two things: 1) command specific frequency ranges for the FM/CW modulation that is offset in frequency from any other sensor 24 by at least 1 to 2 times the IF frequency of the receiver (receiver mixer output); 2) it can synchronize the start and stop times of the sensors to be exact so that the programmed frequency difference between the sensors is always maintained throughout the frequency modulation period. That exactly prevents jamming or interaction among the sensors.

Figure 4:
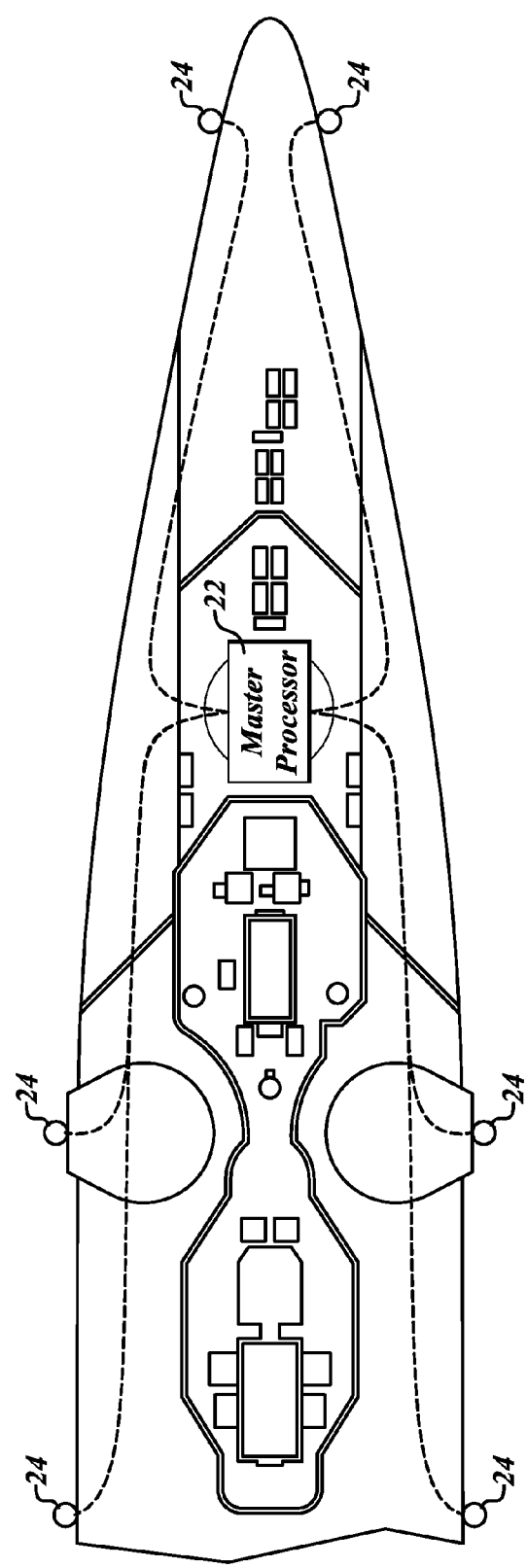
FIGS. 4-6 illustrate the systems of FIG. 1 implemented on various vehicles.
Figure 5:
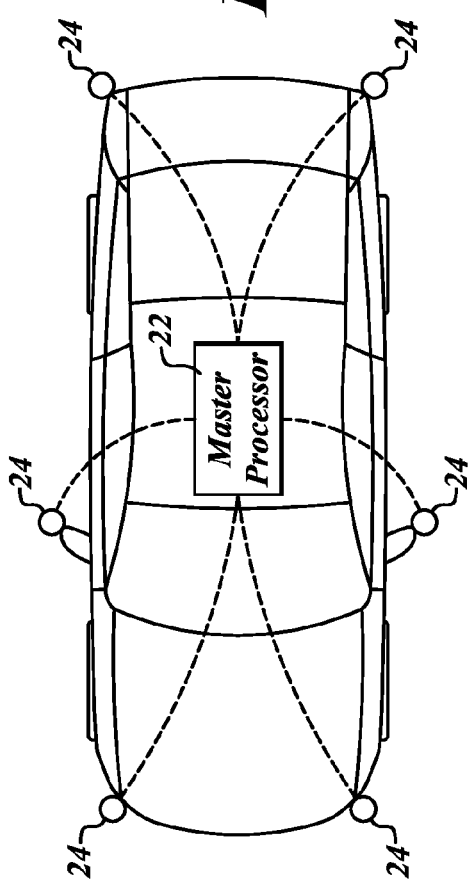
Figure 6:
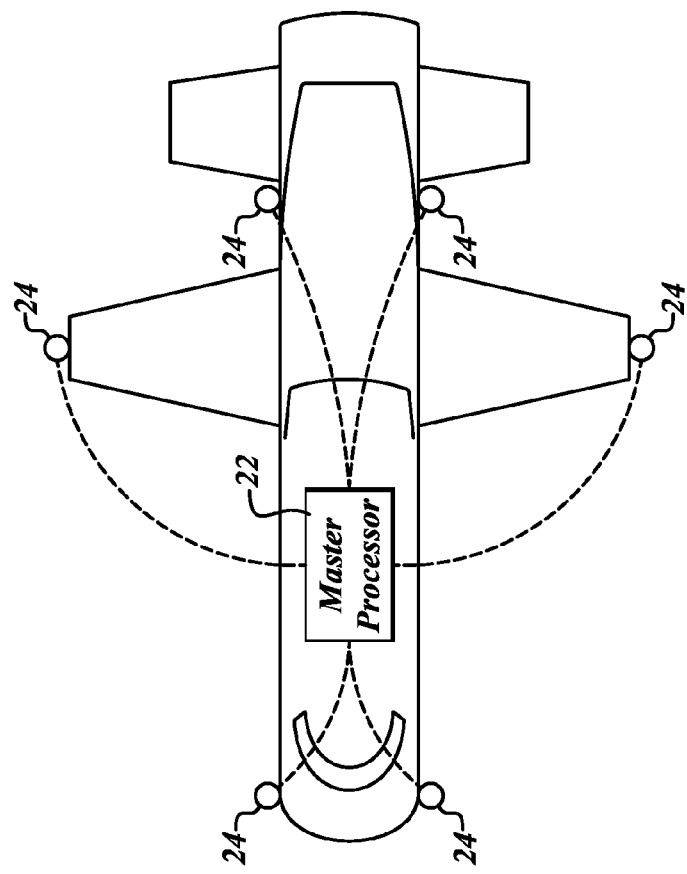

FIG. 4 illustrates a top, partial view of a ship having four radar components 24 mounted on exterior surfaces of the ship and the master processor 22 being located to receive data from the radar components 24. FIGS. 5 and 6 illustrate similar systems mounted on a car and an aircraft.

While the preferred embodiment of the invention has been illustrated and described, as noted above, many changes can be made without departing from the spirit and scope of the invention. In one embodiment, the system 20 is adaptable to any legal radar band up to 95 GHz with a common digitally synthesized control loop. It can go higher than 95 GHz. There is no fundamental limitation at 95 GHz except that most typical operating bands end there. When you get to 100 GHz and above you get close to bands known as "Near IR"— meaning that you are approaching the wavelengths of Infrared radiation. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A radar system located on a vehicle, the system comprising:
    a central processor;
    a plurality of sensor transceivers located at various points around the vehicle, the plurality of sensor transceivers being in signal communication with the central processor, the plurality of sensor transceivers comprising:
        at least one antenna;
        receive electronics in signal communication with the at least one antenna and the processor; and
        transmit electronics in signal communication with the at least one antenna, the transmit electronics configured to output radar signals via the at least one antenna, the transmit electronics comprising:
            a voltage controlled oscillator (VCO);
            a dielectric resonator oscillator (DRO);
            a phase locked loop (PLL) component;
            a direct digital synthesizer (DDS);
            a mixer configured to combine a signal produced by the DRO with a millimeter wavelength signal produced by the VCO; and
            a low pass filter configured to filter a high frequency component of the output of the mixer and apply the remaining low frequency component to the PLL component,
        wherein the receive electronics are configured to receive from the at least one antenna any radar reflections corresponding to the outputted radar signals and to send signals associated with the radar reflections to the processor,
    wherein the central processor is configured to generate output signals based on the signals received from the plurality of sensor transceivers.

2. The system of claim 1,
    wherein the DDS produces a reference signal for the PLL component and the PLL component generates a control signal for the VCO.

3. The system of claim 2, wherein the transmit electronics further comprises a clock configured to generate an input into the DDS.

4. The system of claim 2, wherein the central processor is configured to coordinate the plurality of sensor transceivers causing the plurality of sensor transceivers to be synchronous and have specific offset frequencies in order to prevent one of jamming or interfering with each other.

5. The system of claim 2, wherein the central processor is configured to sweep from sensor transceiver to sensor transceiver to collect data and generate a sense of surroundings of the vehicle.

6. The system of claim 2, wherein the central processor is configured to dwell at one of the sensor transceivers based on one of a predefined protocol or manual request.

7. The system of claim 2, wherein the central processor is configured to jump between the sensor transceivers based on one of a predefined protocol or manual request.

8. A method for sensing targets located around a vehicle, the method comprising:
 at each of a plurality of sensor transceivers:
  transmitting radar signals via at least one antenna, transmitting comprising:
   mixing a signal produced by a dielectric resonator oscillator (DRO) with a millimeter wavelength signal produced by a voltage controlled oscillator (VCO);
   filtering out a high frequency component of the output of the mixer;
   applying the remaining low frequency component to the PLL component; and
   applying a reference signal produced by a direct digital synthesizer (DDS) to the PLL component;
  receiving from the at least one antenna any radar reflections corresponding to the transmitted radar signals;
  sending signals associated with the received radar reflections to a central processor; and
 generating at the central processor output signals based on the sent signals.

9. The method of claim 8, wherein applying the reference signal comprises applying a clock signal to the DDS.

10. The method of claim 8, further comprising coordinating at the central processor the plurality of sensor transceivers causing the plurality of sensor transceivers to be synchronous and have specific offset frequencies in order to prevent one of jamming or interfering with each other.

11. The method of claim 8, further comprising sweeping the central processor to receive from one sensor transceiver to another sensor transceiver to collect data and generate information related to a sense of surroundings of the vehicle.

12. The method of claim 8, further comprising dwelling the central processor at one of the sensor transceivers based on one of a predefined protocol or manual request.

13. The method of claim 8, further comprising jumping the central processor between the sensor transceivers based on one of a predefined protocol or manual request.

* * * * *